Figure 1:
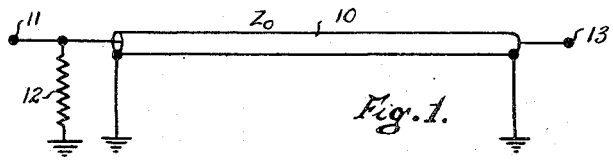

May 8, 1951  D. C. ESPLEY  2,552,160
ELECTRICAL NETWORK FOR THE SUPPRESSION OF ECHOES
AND THE LIKE IN ELECTRICAL SIGNALING SYSTEMS
Filed Oct. 13, 1948  2 Sheets-Sheet 1

INVENTOR
DENNIS CLARK ESPLEY

BY *John R. Harvey*

ATTORNEY

INVENTOR
DENNIS CLARK ESPLEY

Patented May 8, 1951

2,552,160

UNITED STATES PATENT OFFICE 2,552,160

ELECTRICAL NETWORK FOR THE SUP-
PRESSION OF ECHOES AND THE LIKE
IN ELECTRICAL SIGNALING SYSTEMS

Dennis Clark Espley, North Wembley, England, assignor to The General Electric Company, Limited, London, England Application October 13, 1948, Serial No. 54,295
In Great Britain November 14, 1947

6 Claims. (Cl. 178—44)

1

The present invention relates to electrical waveform correcting networks and to electrical signalling systems incorporating such networks for the suppression or substantial reduction of echo signals such as may be produced for example in radio-relay links or in co-axial cables. The term "echo signals" is meant to include both signals which are in the nature of true echoes and other signals having like characteristics.

The characteristics of an "echo signal" which the invention is concerned to suppress are a waveform substantially the same as that of a desired signal with which they are combined and of equal or smaller amplitude, and a time delay of the "echo" waveform relatively to that of the desired signal. The invention is concerned to suppress two or more discrete echo signals of the character set forth or an undesired signal having a waveform which can be substantially represented by a combination of such echo signals.

For example if a signal be transmitted from a transmitter to a receiver along two paths of different electrical length, the combined output will, in general, have the characteristics of a desired signal and an echo signal.

The specifications of co-pending applications Nos. 765,736, filed August 2, 1947, Espley et al., for "Radio Signalling Systems," now abandoned, and British application Nos. 11,879/47 and 25,872/47 describe certain means which may be adopted for substantially removing or greatly reducing the amplitude of such echoes.

The general method adopted in the above-mentioned co-pending specifications consists in combining with the desired signal, containing the undesired echo signal, a corrective signal which is in opposite phase or of opposite sign to the echo signal and of suitable amplitude.

The means adopted in two of the earlier specifications referred to, namely No. 765,736 and British application 25,872/47 for generating the correcting signals are relatively complicated. Thus in the arrangement described in the specification of British application No. 25,872/47 there is required for each echo signal to be corrected a separate delay network having an electrical length such that the delay of the echo signal relatively to the desired signal by which it is originated has the desired value. Specification of British application No. 11,879/47 is concerned with the suppression of only a single echo.

The present invention has for its object to provide simpler and cheaper networks capable of achieving the same results as are effected with

2 the aid of the networks described in the earlier specifications referred to Nos. 765,736 and British application No. 25,872/47.

The difficulties that are met with when an attempt is made to simplify the networks above referred to will be explained with reference to Figures 1 and 2 of the accompanying drawing. In Figure 1 there is shown a delay network constituted by a length of coaxial transmission line 10. In this figure, as well as in all the other figures of the drawings, a delay network is represented by a coaxial line, but it is to be understood that it may be constituted in any other known or suitable manner. For instance, it may consist of a network containing a number of impedance elements which may have either lumped or distributed impedance. One end of the delay network 10 is connected to an input terminal 11 and through a resistance 12 to earth. The characteristic impedance of the delay network is $Z_0$ and the resistance 12 is made equal to $Z_0$ so that at the left-hand end of the network there is matching of impedance, and no reflection of energy arriving from the right-hand side of the figure will take place at the left-hand side. The end 13 of the delay network remote from the terminal 11 is shown open-circuited. It might, however, be short-circuited or terminated in a resistance differing from $Z_0$. In any case, the termination is assumed to be such that reflection takes place at this end.

If a pulse be applied to the terminal 11, the pulse will travel through the line 10 and be reflected back to the terminal 11, where, for the reason already stated, it will be wholly absorbed, and no further reflection from this end will take place. With the simple network of Figure 1, therefore, there can be produced at the terminal 11 a single echo signal whose delay time relatively to the desired signal which initiated it is determined by the length of the line 10. The delay time of a network is, for the purpose of this specification, defined in the following manner. If a short exciting voltage pulse be applied to the input of the network, the echo voltage pulse occurring at the input due to the exciting pulse travelling along the network and being reflected back along the network to the input will, in general, have a different waveform from the exciting pulse. Because of this difference in waveform, measurement of time delays may present difficulties. The waveform of the echo pulse will differ from that of the exciting pulse mainly by the substantial absence from the latter of certain components which are suppressed by the network and by the difference of phase velocity of the components. In measuring the delay time, therefore, it is assumed that the exciting pulse has substantially the waveform of an echo pulse produced by a short pulse and the delay time of the network is defined as the time delay between corresponding points, for example points at half amplitude, on the echo pulse waveform compared with the exciting pulse waveform.

Figure 2:
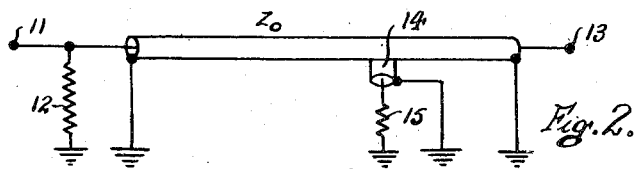

Referring now to Figure 2, the conditions at the end 11 are assumed to be the same as in Figure 1, that is to say the impedance 12 is matched to the impedance $Z_0$. The conditions at the end 13 are also assumed to be the same as in Figure 1. In Figure 2, however, there is provided at the point 14 a discontinuity constituted by a resistance 15 connected between the inner and outer conductors of the coaxial line. This discontinuity serves to reflect some of the energy passing from 11 to 13 back towards the terminal 11. The remaining energy passes on to the end 13 and is reflected from this point back towards the terminal 11. When this energy reflected from the end 13 reaches the point 14, however, some of it will be reflected back towards 13, owing to the presence of the discontinuity, and only the remaining part will proceed towards the end 11. The energy reflected from 14 towards 13 will again be reflected at 13 back towards 11, some of this energy passing the point 14 and the remainder being reflected once again back towards 13. It will therefore be seen that by providing two discontinuities one at 14 and one at 13, there is produced at the terminal 11, not merely two echoes, but an infinite series of echoes owing to the repeated reflection between the points 13 and 14. The arrangement of Figure 2 is not, therefore, suitable for use in carrying out the present invention. This difficulty becomes even more pronounced when more than one discontinuity is provided between the two ends of the network.

The present invention is based on the discovery that it is possible to design a network suitable for the purpose in view and including a circuit which constitutes a discontinuity to energy travelling therethrough in one direction but no discontinuity to energy travelling therethrough in the opposite direction.

According to the present invention, therefore, a waveform correcting system for the suppression or substantial reduction of two or more echo signals of different delay times relatively to a desired signal comprises a delay network structure including a first and a second delay network connected in cascade and having inserted in the connection between them a circuit such that the impedance presented by the first delay network by the combination of the said circuit and second delay network differs from the impedance of the first delay network and such that the impedance presented to the second delay network by the combination of the said circuit and first delay network is substantially equal to the impedance of the second delay network, a suitable impedance or impedance arrangement being provided at the input end of the first delay network for applying signals from which the echo signals are to be removed and for taking off the desired signals.

The present invention also provides a waveform correcting system for suppressing or at least substantially reducing the amplitude of two echo signals of different times of occurrence, by combining with the echo signals correcting signals of opposite sign or phase, the system comprising a delay network structure having a suitable impedance or impedance arrangement to which the signals containing the echo signals to be reduced are applied and from which the desired signals can be taken off, and at two points in the delay network structure, discontinuities giving rise to reflections of signal energy reaching such points from said terminals, the said points being so selected that the energy reflected therefrom reaches the said impedance or impedance arrangement at the appropriate times to effect the required reduction in echo amplitude and the discontinuity nearer the said impedance or impedance arrangement being of such nature that reflection of energy arriving at the discontinuity from the side thereof remote from the said impedance or impedance arrangement is negligible.

Figure 5:
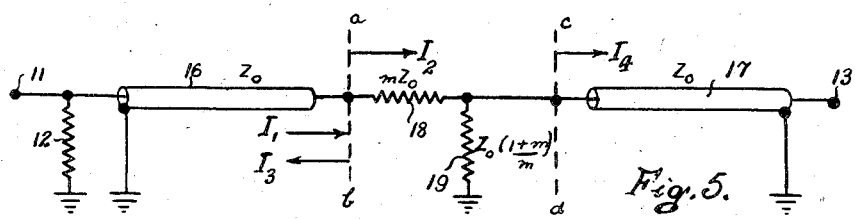
Figure 6:
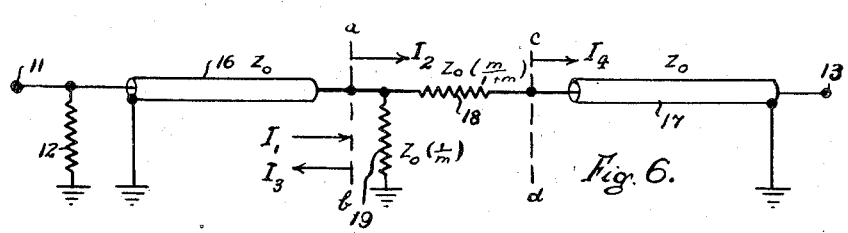
Figure 7:
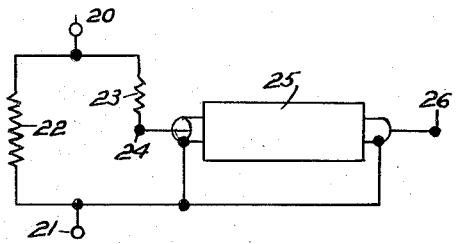

The invention will be further described with reference to Figures 3 to 7 of the accompanying drawing each of Figures 3 to 6 showing diagrammatically the greater part of an arrangement according to the invention, and Fig. 7 showing diagrammatically a correcting system according to the invention and with reference to the accompanying drawing in which Figures 8 and 9 (a) are explanatory diagrams and Figure 9 (b) shows diagrammatically a further arrangement according to the invention.

Figure 3:
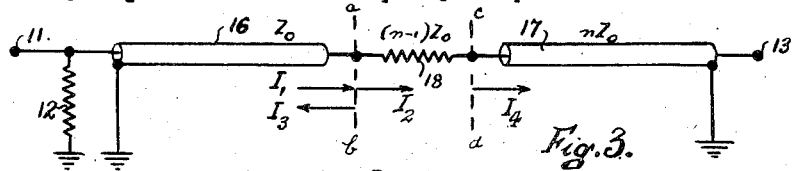

Referring to Figure 3, the delay network shown is divided into two parts 16 and 17, separated by a resistance 18. The conditions at the two ends 11 and 13 are assumed to be the same as in Figures 1 and 2. The delay network 16 has a characteristic impedance $Z_0$ and the delay network 17 has a characteristic impedance $nZ_0$, where $n$ is assumed to be greater than unity. The resistance 18 is so chosen that reflection takes place at its input end defined by the dotted line $a, b$, when energy reaches this terminal from the direction of the terminal 11, while no reflection takes place at the end represented by the dotted line $c, d$, of energy reaching the point from the end 13. It can be calculated that for this purpose the resistance 18 must have the value $(n-1)Z_0$, for then the characteristic impedance $Z_0$ of the line 16 works into an impedance equal to $(n-1)Z_0+nZ_0$, which is equal to $(2n-1)Z_0$. On the other hand, for energy travelling from the end 13, the characteristic impedance $nZ_0$ works into an impedance equal to $Z_0+(n-1)Z_0$, which is equal to $nZ_0$.

It will be assumed that the current reaching $a, b$ from the line 16 is equal to $I_1$, the current passing into the resistance 18 has the value $I_2$, and that the current reflected at $a, b$ back towards 11 has the value $I_3$. Further, it will be assumed that the current entering the line 17 from the point $c, d$ has the value $I_4$. It can be shown that the reflection coefficient at $a, b$ is equal to $(n-1)/n$, from which it follows that $I_2=I_1/n$, $$I_3=I_1(n-1)/n$$

$I_4$ being equal to $I_2$.

With the arrangement shown in Figure 3, therefore, it will be evident that a pulse applied at terminal 11 travels along the line 16, a part is reflected back to 11 where it is absorbed, the delay time of this reflected part being determined by the electrical length of the line $Z_0$. The part $I_2$ which is not reflected at $a, b$ passes on through the resistance 18 past the point $c, d$ where it becomes $I_4$, travels through the line 17 and at the end 13 is reflected back along the line 17 to the point $c, d$ where no reflection takes place, it continues through the resistance 18 into the line 16 and returns to the terminal 11 where it is absorbed. The delay time of the reflected pulse arriving at 11 after reflection at 13 is determined by the sum of the electrical lengths of the two lines 16 and 17.

The arrangement of Figure 3 therefore serves to produce at the terminal 11 two echo signals whose time delay relatively to the desired signal at 11 is determined by the length of the lines 16 and 17. Clearly, further sections of line can be added to the end 13 with the aid of further resistances such as 18 to provide further echoes where these are required.

It is to be noted that at both these reflection points $a, b$ and 13, the energy passes from a lower to a higher impedance, in the first case from $Z_0$ to $(2n-1)Z_0$ and in the second case from $nZ_0$ to infinity. The reflected voltage arriving at the terminal 11 will, therefore, have the same sign or phase as the voltage producing the reflection. Echoes so produced will be called positive echoes. So far as the end 13 is concerned, a reversal of phase to provide a negative echo can be produced by providing at this end, instead of the open circuit, a short circuit or a terminating resistance having a value less than $nZ_0$. The way in which reversal can be obtained at the point $a, b$ is shown in Figure 4.

As shown in this figure, the line 16 is given a characteristic impedance $nZ_0$ and the line 17 a characteristic impedance $Z_0$. The resistance of the circuit between points $a, b$ and $c, d$ is in this case a shunt-resistance 19. It can be shown that this resistance should have a value $Z_0n/(n-1)$. In this case also the reflection coefficient is $(n-1)/n$. $I_3$ is therefore equal to $$I_1(n-1)/n, I_2 = I_1(2n-1)/n, \text{ and } I_4 = I_1$$

Figure 4:
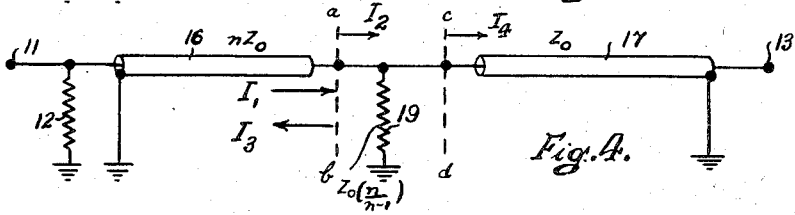

In the example shown in Figure 4, therefore, there will be produced at the terminal 11 in response to a desired signal applied at this terminal, two reflected signals, a negative one from the point $a, b$ having a time delay determined by the length of the line 16, and the other, a positive echo reflected from the end 13, having a time delay determined by the sum of the lengths of the lines 16 and 17. If both reflected signals are required to be negative, the end 13 is short-circuited or terminated in a resistance smaller than $Z_0$.

In the arrangement of Figures 3 and 4, there is the disadvantage that lines of different characteristic impedance or equivalent delay network of different characteristic impedance are required. This is sometimes inconvenient. Arrangements whereby lines or delay networks of the same characteristic impedance can be used will be described with reference to Figures 5 and 6.

In Figure 5, the circuit between $a, b$ and $c, d$ consists of a series resistance 18 of value $mZ_0$, followed by shunt resistance 19 of value $Z_0(1+m)/m$, where $m$ is given a suitable positive value other than zero according to the amplitude of the required reflected voltage. In this case, the reflection coefficient has the value $[m/(1+m)]^2$. $I_3$ is therefore equal to $$I_1[m/(1+m)]^2$$

$I_2$ is equal to $I_1[(1+2m)/(1+m)^2]$ and $I_4$ equals $I_1/(1+m)$. In this case, the energy reflected at the point $a, b$ is in the form of a positive echo.

Figure 6 shows a similar arrangement for obtaining a reversal of sign of the reflection at $a, b$ so that the energy reflected from this point back to 11 is in the form of a negative echo. In this case the shunt resistance 19 is connected before the series resistance 18. The resistance 19 has the value $Z_0/m$ and the resistance 18 has the value $Z_0m/(1+m)$. The reflection coefficient in this case is equal to $[m/(1+m)]^2$. $I_3$ therefore has the value $I_1[m/(1+m)]^2$, $I_2$ is equal to $I_1[(1+2m+2m^2)/(1+m)^2]$, and $I_4$ is equal to $I_1[1/(1+m)]$.

One way in which the circuits of Figs. 3 to 6 can be applied to the purpose in view is shown in Fig. 7. The signal to be corrected is applied between terminals 20 and 21. The terminal 20 is connected through a resistance 23 to the input terminal 24 of a delay network 25. This network may be of the kind shown in any of Figs. 3 to 6 or may involve parts of one of these figures and parts of another and it may contain any desired number of sections such as 16 and 17 in Figs. 3 to 6. The output terminal 26 of the network may be open-circuited as shown, short-circuited, or terminated by a suitable resistance according to the sign and amplitude of the reflection required from this terminal. The resistance 23 has a value equal to the characteristic impedance of the first section of the delay network 25. The resistance 22 is given a value to suit the ratio between the amplitude of the initiating signal and the sum of the corrective signals generated at 20, 21 by reflections of this initiating signal at points in the network 25. In the particular case where these two quantities are equal, the resistance 22 is infinite and is therefore omitted.

It has been assumed in the description of Figs. 3 to 6 that the resistance 12 provided a matched termination at the end 11. In the practical form of the circuit shown in Fig. 7 the arrangement is made such that at the moment when a corrective signal reaches the terminals 20, 21 after reflection from some point in the network 25, the echo signal to be corrected is also present at the terminals 20, 21. The amplitudes of these two signals are substantially equal and their phases or signs are opposite and consequently they neutralise one another and no appreciable energy remains to be reflected back into the network 25.

It is to be noted that in an arrangement such as that of Fig. 7 embodying circuits such as are shown in any of Figs. 3 to 6, the amplitudes of the individual correcting signals generated may be adjusted to the required values by suitable choice of $n$ or $m$, as the case may be, and, in the case of the echoes from the termination 13, by choice of the value of a terminating impedance at terminal 26 in Fig. 7. The overall amplitude level can be adjusted by suitable choice of the resistance 22. It may be convenient to choose the value of the resistance 22 to be such that the termination at 26 can be made of zero or infinite impedance.

Formulae will now be given connecting the design of the network with the ratio $k$ of the amplitude of a correcting signal produced at the terminals 20, 21 in Fig. 7 to the amplitude of a desired signal at the same terminals, by which the echo was initiated.

In the first case the characteristic impedances of the sections of the network (such as 16 and 17) are assumed to be different as in Figs. 3 and 4, the ratio of the characteristic impedances of the first and second sections being $n_1$, that of the second and third sections $n_2$ and so on. The said ratio $k$ will be assumed to have a subscript according to the point from which the correcting signal was reflected, the first such point being between the first and second section. Thus $k_r$ is the ratio for the corrective signal reflection from between the $k_r$ and $k_{r+1}$ sections. The value of $k_r$ is given by:

$$k_r = [(n_r-1)/n_r]\pi_1^{p=r-1}(1/n_p)$$

where $\pi$ denotes a continuing product.

In the second case the characteristic impedance of all the sections is assumed to be the same, as in Figs. 5 and 6, and $m$ is assumed to have the significance already given to it, the subscript $r$ referring, as before, to a reflection from between the $r^{th}$ and the $(r+1)^{th}$ sections. In this case:

$$k_r = m^2{}_r/(1+m_r)^2\pi_1^{p=r-1}[1/(1+m_p)]$$

In both cases the formulae are applicable whether the corrective signals are positive or negative or partly positive and partly negative.

The circuit shown in Figure 7 is suitable for use with a high impedance source connected between terminals 20 and 21. By high impedance is meant an impedance high in comparison with that of the circuit of Figure 7 between terminals 20 and 21. The effect is that changes in the impedance of this circuit have a negligible effect upon the current from the source flowing into and out of the circuit of Figure 7.

The way in which this circuit can be adapted for use with a source of relatively low impedance will be described with reference to Figures 8 and 9. For the purpose in view use is made of a known transformation. In Figure 8 (a) is shown a circuit comprising two impedances $Z_a$ and $Z_b$ connected in parallel between terminals 20 and 21. These impedances may for instance be the resistance 22 in Figure 7 on the one hand and the resistance 23 and network 25 on the other hand. The output voltage V is taken as shown across terminals $T_1$ and $T_2$ which are connected to 20 and 21 respectively.

Figure 8:
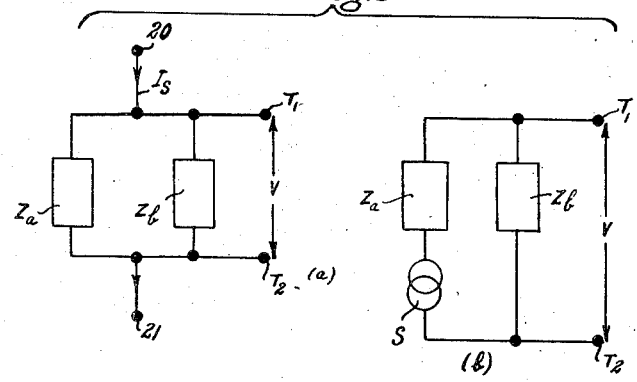

It is known that the circuit of Figure 8 (b) is the equivalent of that in Figure 8 (a). The former circuit differs from the latter in that the source S is connected in series with one of the impedances, in this case $Z_a$. If the current from the source passing between terminals 20 and 21 in Figure 8 (a) is $I_s$, the source S must be arranged to have an E. M. F. equal to $I_s Z_a$. The output voltage V at terminals $T_1$ and $T_2$ will then be the same as in Figure 8 (a). In this case it is the E. M. F. of the source which is independent of changes in the impedance of the circuit.

Figure 9:
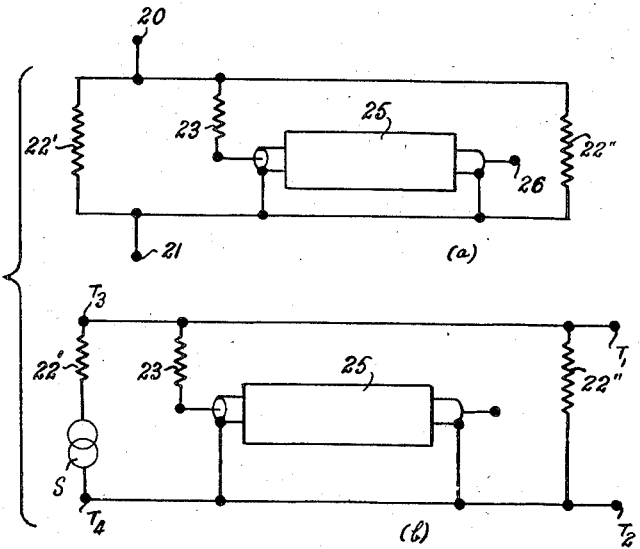

The circuit of Figure 7 can clearly be modified as shown in Figure 9 (a) without changing its characteristics. The change consists in dividing the resistance 22 into two parallel parts 22' and 22". If resistance 22 has the value R and if resistances 22' and 22" have the values $R_1$ and $R_2$ respectively, then the condition $R_1 R_2/R_1+R_2=R$ must be satisfied. The transformation shown in Figure 8 may then be applied to the circuit of Figure 9 (a) to produce the circuit of Figure 9 (b). The source S of desired and echo signals to be corrected may be of relatively low impedance and the output voltage is taken at terminal $T_1$ and $T_2$. The resistance 22' includes that of the source S. Evidently a considerable degree of freedom in the choice of a value for the resistance 22" is available with this circuit.

For the purpose of this specification and claims, the combination of S and 22' will be regarded as the source of signals to be corrected which are then assumed to be applied between terminals $T_3$ and $T_4$. If the actual impedance of the source is less than 22', a series resistance is assumed to be added to bring the source impedance to the value of 22'. Likewise the resistance 22" may be wholly or in part constituted by the impedance of a circuit to which the terminals $T_1$ and $T_2$ are connected. Thus for example the combination of S and 22' may be a feeder connected between terminals $T_3$ and $T_4$. Similarly the resistance 22" may be replaced by a feeder connected between terminals $T_1$ and $T_2$.

It may be noted that although in Fig. 7 the resistance 22 may be infinite (it may be omitted), in Fig. 9 (b) the resistance 22' cannot be made infinite.

It is to be understood that the present invention can be applied to signals such as video or audio signals or to a carrier modulated in amplitude, frequency or phase with any suitable modulation. Where a carrier is employed it is to be noted that all non-linear devices such as detectors are assumed to be absent. If non-linear devices are included between the point where the undesired echo signals combine with the desired signal and the point where they are to be removed therefrom, the invention is not always applicable in the manner described.

The difficulty arises from differences in the phases of the carrier waves of the desired and echo signals. By suitable adjustment of the carrier frequency in a transmitter, as described in the specification of application No. 765,736, it can often be arranged that the present invention serves substantially to eliminate at least two echo signals and these may be chosen to be the most objectionable, usually those of largest amplitude.

What is known as a first detector in a radio receiver is not regarded as a non-linear device in the sense of affecting the application of the invention since its function is merely to change the frequency carrier without modifying the character thereof.

The invention is therefore applicable without difficulty to the intermediate frequency amplifier in radio receiving equipment.

What is known as a second detector which extracts the modulation is, however, a non-linear device calling, in general, for adjustment of the carrier phase.

I claim:

1. A waveform-correcting system for the substantial reduction of the amplitude of two echo signals of different delay times relatively to a desired signal, the system comprising a first and a second delay network, an input circuit connected to the input terminals of said first delay network for applying said desired and echo signals thereto, a coupling circuit connecting the output terminals of said first delay network to the input terminals of said second delay network, said input circuit having an impedance so proportioned with reference to the characteristic impedance of said first delay network as to avoid reflection therefrom of energy arriving thereat from said first delay network, the impedance presented by said coupling circuit and second delay network to the output terminals of said first delay network being different from said characteristic impedance of said first delay network, whereby reflection takes place at these output terminals of energy reaching said coupling circuit from said first delay network, and the impedance presented by said coupling circuit and first delay network to the input terminals of said second delay network being substantially equal to the characteristic impedance of said second delay network, whereby reflection of energy reaching said coupling circuit from said second delay network is substantially prevented, and a termination at the output terminals of said second delay network to provide reflection of energy from such terminals back along said second delay network.

2. A system according to claim 1, wherein said input circuit includes a resistor having a value substantially equal to that of said characteristic impedance of said first delay network.

3. A waveform-correcting system for the substantial reduction of the amplitude of at least two echo signals of different delay times relative to the desired signal, the system comprising an input circuit for the application of the desired and echo signals to the system, a first and a second delay network coupled to said input circuit and having characteristic impedances $Z_0$ and $nZ_0$, respectively, where $n$ is greater than unity, connected in cascade, said first delay network being terminated at its input end by an impedance having a value equal to the characteristic impedance of said first delay network to avoid reflection of energy arriving thereat from said delay networks and the output end of said second delay network being terminated by an impedance having such a value as to reflect from said end energy arriving thereat from said second delay network, and connected in series between said first and second delay networks a resistor of resistance substantially equal to $(n-1)Z_0$.

4. A waveform-correcting system for the substantial reduction of the amplitude of at least two echo signals of different delay times relative to the desired signal, the system comprising an input circuit for the application of the desired and echo signals to the system, a first and a second delay network coupled to said input circuit and having characteristic impedances $nZ_0$ and $Z_0$, respectively, where $n$ is greater than unity, connected in cascade, said first delay network terminated at its input end by an impedance having a value equal to the characteristic impedance of said first delay network to avoid reflection of energy arriving thereat from said second delay network, and connected in shunt across said delay networks at the junction point thereof a resistor of value substantially equal to $nZ_0/(n-1)$.

5. A waveform-correcting system for the substantial reduction of the amplitude of at least two echo signals of different delay times relative to the desired signal, the system comprising an input circuit for the application of the desired and echo signals to the system, first and second cascade connected delay networks of substantially like characteristic impedance $Z_0$, said first delay network being terminated at its input end by an impedance having a value equal to the characteristic impedance of said first delay network to avoid reflection at said terminals of energy arriving thereat from said second delay network, a first resistor of value substantially equal to $mZ_0$ connected in series between said delay networks and a second resistor of value substantially equal to $Z_0(1+m)/m$ connected in shunt across the input terminals of said second delay network, where $m$ is a positive constant.

6. A waveform-correcting system for the substantial reduction of the amplitude of at least two echo signals of different delay times relative to the desired signal, the system comprising an input circuit for the application of the desired and echo signals to the system, a first and a second delay network of substantially like characteristic impedance $Z_0$ coupled to said input circuit and connected in cascade with each other, said first delay network being terminated at its input end by an impedance having a value equal to the characteristic impedance of said first delay network to avoid reflection of energy arriving thereat from said second delay network, a first resistor of value substantially equal to $mZ_0/1+m)$ connected in series between said delay networks and a second resistor of value substantially equal to $Z_0/m$ connected in shunt across the remote end of said first delay network, where $m$ is a positive constant.

DENNIS CLARK ESPLEY.

REFERENCES CITED

The following references are of record in the file of this patent:

UNITED STATES PATENTS

| Number | Name | Date |
| --- | --- | --- |
| 2,310,692 | Hansell | Feb. 9, 1943 |
| 2,448,635 | Smith | Sept. 7, 1948 |

FOREIGN PATENTS

| Number | Country | Date |
| --- | --- | --- |
| 489,704 | Great Britain | Aug. 2, 1938 |
| 50,047 | France (Addition to No. 842,357) | Nov. 10, 1939 |